(12) United States Patent
Xiao et al.

(10) Patent No.: US 10,823,910 B2
(45) Date of Patent: Nov. 3, 2020

(54) SMALL CORE-DIAMETER GRADED-INDEX OPTICAL FIBER

(71) Applicant: YANGTZE OPTICAL FIBRE AND CABLE JOINT STOCK LIMITED COMPANY, Wuhan, Hubei (CN)

(72) Inventors: Wufeng Xiao, Hubei (CN); Runhan Wang, Hubei (CN); Rong Huang, Hubei (CN); Halying Wang, Hubei (CN); Anlin Zhang, Hubei (CN); Di Yang, Hubei (CN); Tiejun Wang, Hubei (CN)

(73) Assignee: YANGTZE OPTICAL FIBRE AND CABLE JOINT STOCK LIMITED COMPANY, Wuhan, Hubei (CN)

( * ) Notice: Subject to any disclaimer, the term of this patent is extended or adjusted under 35 U.S.C. 154(b) by 0 days.

(21) Appl. No.: 16/542,506

(22) Filed: Aug. 16, 2019

(65) Prior Publication Data

US 2020/0096697 A1 Mar. 26, 2020

(30) Foreign Application Priority Data

Sep. 25, 2018 (CN) .......................... 2018 1 1116300

(51) Int. Cl.
*G02B 6/02* (2006.01)
*G02B 6/028* (2006.01)
*G02B 6/036* (2006.01)

(52) U.S. Cl.
CPC ......... *G02B 6/0281* (2013.01); *G02B 6/0365* (2013.01); *G02B 6/03605* (2013.01)

(58) Field of Classification Search
CPC . G02B 6/0281; G02B 6/03605; G02B 6/0365
USPC .......................................... 385/124
See application file for complete search history.

(56) References Cited

U.S. PATENT DOCUMENTS

| 2012/0243843 A1* | 9/2012 | Molin .................. G02B 6/0281 385/124 |
| 2015/0253499 A1* | 9/2015 | Balemarthy ......... G02B 6/0288 385/124 |

FOREIGN PATENT DOCUMENTS

| CN | 104698535 A | 6/2015 |
| CN | 108333671 A | 7/2018 |
| CN | 108375815 A | 8/2018 |

\* cited by examiner

*Primary Examiner* — Jerry M Blevins
(74) *Attorney, Agent, or Firm* — Tim Tingkang Xia, Esq.; Locke Lord LLP

(57) ABSTRACT

A small core-diameter graded-index optical fiber include a core layer and a cladding having an inner cladding layer, a depressed cladding layer, and an outer cladding layer from inside to outside thereof. The core layer has a parabolic refractive index profile with a distribution index in a range of 1.9-2.1, a radius in a range of 10-21 μm, and a Δ1 max in a range of 0.7-1.7% at a core layer center, and is a silica glass layer co-doped with germanium, phosphorus, and fluoride. The inner cladding layer is a pure silica layer or an F-doped silica glass layer, and has a unilateral width in a range of 0.5-5 μm and a Δ2 in a range of −0.4-0%. The depressed cladding layer has a unilateral width in a range of 2-10 μm and a Δ3 in a range from −0.8% to −0.2%. The outer cladding layer is a pure silica glass layer.

9 Claims, 5 Drawing Sheets

SMALL CORE-DIAMETER GRADED-INDEX OPTICAL FIBER

CROSS-REFERENCE TO RELATED APPLICATION

This application claims priority to Chinese Patent Application No. 201811116300.0, filed Sep. 25, 2018 in the State Intellectual Property Office of P.R. China, which is hereby incorporated herein in its entirety by reference.

FIELD OF THE INVENTION

The present invention relates to a small core-diameter graded-index optical fiber, and belongs to the technical field of optical communication.

BACKGROUND OF THE INVENTION

Multimode fibers and VCSEL multimode transceivers, and single-mode fibers and single-mode transceivers can all be used in a data center. Among them, single-mode transmission systems are used more frequently in emerging ultra-large data centers to meet the demand for longer transmission distances in the data centers. Benefiting from the relatively low costs and power consumption of VCSEL optical modules, multimode transmission systems still dominate the transmission within 100 m. The multimode fiber has a relatively small product of bandwidth distances due to intermodal dispersion. As the requirements for bandwidth and transmission distances in data centers are constantly increasing, multimode applications will be further limited.

As the power consumption and prices of multimode transceivers are much lower than those of single-mode transceivers, it is reasonable in the current situation to use multimode fibers and cheap VCSEL sources for local area network construction. However, if it is necessary to further upgrade the network to a 1310-nm wavelength, it will require re-laying of single-mode fibers, which is obviously not cost-effective. Alternatively, single-mode and multimode fiber hybrid cables can be laid, which increases the investment as well. Therefore, it has become an urgent need to provide the market with a satisfactory new fiber product with application and development prospects.

Existing multimode fibers cannot accommodate high-speed and long-distance transmission networks, while single-mode fibers, although capable of meeting the requirements of high-speed and long-distance transmission, demand expensive transmission and reception systems. In order to solve the above problems, it is a highly feasible method to design a fiber that can simultaneously support multimode and single-mode transmission. Such a fiber not only can meet the requirements of high-speed and long-distance transmission, but also can reduce production costs thereof and decrease network operation and upgrade costs. Therefore, it is necessary to design a fiber that supports both multimode transmission and single-mode transmission to meet the low-cost transmission requirements of communication networks.

SUMMARY OF THE INVENTION

In order to facilitate the introduction of the present invention, some terms are defined as follows.

Core rod: a preform containing the core layer and partial cladding.

Radius: the distance between the outer boundary of a layer and the center point of the core layer.

Refractive index profile: the relationship between a glass refractive index of a fiber or fiber preform (including a core rod) and a radius thereof.

Contribution of fluorine (F): a relative refractive index difference ($\Delta F$) of fluorine (F)-doped quartz glass with respect to pure quartz glass, indicating the doping amount of fluorine (F).

Contribution of germanium (Ge): a relative refractive index difference ($\Delta Ge$) of germanium (Ge)-doped quartz glass with respect to pure quartz glass, indicating the doping amount of germanium (Ge).

Contribution of phosphorus (P): a relative refractive index difference ($\Delta P$) of phosphorus (P)-doped quartz glass relative to pure quartz glass, indicating the doping amount of phosphorus (P).

The inter-mode dispersion existing in multimode fibers largely limits the transmission distance that can be supported thereby. In order to reduce the inter-mode dispersion in the fibers, the core layer refractive index profile of the multimode fiber has to be designed to assume a continuously decreasing refractive index distribution from a center to an edge, which is usually termed as an "$\alpha$ profile," i.e., a refractive index distribution satisfying the power exponential function as follows:

$$n^2(r) = n_1^2 \left[1 - 2\Delta_0 \left(\frac{r}{a}\right)^\alpha\right] \quad r < a$$

wherein $n_1$ is the refractive index at fiber center; r is the distance from the fiber center; a is a fiber core radius; $\alpha$ is a distribution index; and $\Delta_0$ is a relative refractive index difference between a fiber core center and a cladding thereof.

The relative refractive index difference is $\Delta_i$:

$$\Delta_i\% = [(n_i^2 - n_0^2)/2n_i^2] \times 100\%,$$

wherein $n_i$ is the refractive index at position i away from a center of the fiber core; $n_0$ is the refractive index of a pure silica material, and is usually also the refractive index of the fiber cladding.

The technical problem to be solved by the present invention is, directed against the shortcomings of the existing technologies described above, to provide a small core-diameter graded-index optical fiber having a reasonable design in material composition and core cladding structure and capable of supporting both multimode and single-mode transmission.

A technical solution adopted by the present invention in order to solve the above-mentioned problem is as follows: a small core-diameter graded-index optical fiber, comprising: a core layer and a cladding which includes an inner cladding layer, a depressed cladding layer, and an outer cladding layer from inside to outside thereof, wherein the core layer has a parabolic refractive index profile with a distribution index $\alpha$ in a range from 1.9 to 2.1, a radius R1 in a range from 10 to 21 μm, and a maximum relative refractive index difference $\Delta 1$ max in a range from 0.7% to 1.7% at a core layer center, and is a silica glass layer co-doped with germanium (Ge), phosphorus (P), and fluoride (F); the inner cladding layer is a pure silica layer or an F-doped silica glass layer, and has a unilateral width (R2−R1) in a range from 0.5 to 5μm and $\Delta 2$ in a range from −0.4% to 0%; the depressed cladding layer has a unilateral width (R3−R2) in a range from 2 to 10 μm and a relative refractive index difference $\Delta 3$ in a range from −0.8% to −0.2%; and the outer cladding layer is a pure silica glass layer.

According to the above technical solution, P and Ge are used as positive dopants in the core layer, and a concentration of P in the core layer changes to form, from inside to outside, a flat region in which the concentration of P remains substantially unchanged and a graded region in which the concentration of P gradually decreases, and wherein the flat region has a width T1 in a range from 1 to 19.5 μm, and the graded region has a width T2=R1−T1, and T2>1.5 μm.

According to the above technical solution, the contribution ΔP0 of P at the core layer center is in a range from 0.01% to 0.30%; the contribution of P at a boundary between the flat region and the graded region is ΔP1; a contribution fluctuation of P at a boundary between the core layer center and the flat region is $$\Delta P10 = 2\left|\frac{\Delta P1 - \Delta P0}{\Delta P1 + \Delta P0}\right|,$$

ΔP10 being less than or equal to 5%; the contribution ΔP2 of P at an outer edge of the core layer is in a range from 0% to 0.15%; and a contribution difference of P between the flat region and an outer edge of the graded region is ΔP21=ΔP2−ΔP1, ΔP21 being in a range from −0.3% to −0.01%.

According to the above technical solution, F is used as a negative dopant in the core layer, and has a doping amount increasing from the core layer center to an edge of the core layer, a contribution ΔF0 of F at the core layer center being in a range from 0.0% to −0.1%, and a contribution ΔF1 of F at the edge of the core layer being in a range from −0.45% to −0.1%.

According to the above technical solution, the inner cladding layer has a relative refractive index difference Δ2 less than or equal to a relative refractive index difference Δ1 min at the edge of the core layer, i.e., Δ2≤Δ1 min.

According to the above technical solution, the fiber has a bandwidth of 3500 MHz-km or more than 3500 MHz-km at a wavelength of 850 nm, a bandwidth of 2000 MHz-km or more than 2000 MHz-km at a wavelength of 950 nm, and a bandwidth of 500 MHz-km or more than 500 MHz-km at a wavelength of 1300 nm.

Further, the fiber has a bandwidth of 5000 MHz-km or more than 5000 MHz-km at a wavelength of 850 nm, a bandwidth of 3300 MHz-km or more than 3300 MHz-km at a wavelength of 950 nm, and a bandwidth of 600 MHz-km or more than 600 MHz-km at a wavelength of 1300 nm.

According to the above technical solution, a fundamental mode $LP_{01}$ of the fiber at 1310 nm or 1550 nm has a mode field diameter in a range from 8 to 12 μm.

According to the above technical solution, the fiber has a macrobending loss of less than 0.2 dB with a 7.5 mm-bending radius and two turns at a wavelength of 850 nm, and a macrobending loss of less than 0.5 dB with a 7.5 mm-bending radius and two turns at a wavelength of 1300 nm.

According to the above technical solution, the core layer has a radius R1 in a range from 12 to 20 μm.

The present invention has the following beneficial effects. (1) By optimizing a doping amount of fluorine in the core layer, the present invention realizes the optimization of the bandwidth performance in optical transmission, and reduces the bandwidth-wavelength sensitivity while improving the bandwidth performance. (2) Ge/P/F co-doping is used in the core layer of the fiber. Increase in the concentration of phosphorus and decrease in the concentration of germanium can help to improve the material dispersion characteristics of the core, reduce the chromatic dispersion, and further improve the bandwidth performance. (3) P is not easy to form an accurate refractive index profile by precise control of flowmeter, and is easy to volatilize and diffuse, so P-doping was designed to be a relatively fixed concentration and very small concentration difference at the flat region of the core layer. The graded refractive index of the core layer is precisely controlled by Ge/F. (4) The core layer is doped with P and divided into the flat region and the graded region. The concentration of P in the graded region decreases gradually. A certain width of graded region can avoid profile distortion caused by diffusion of P into the inner cladding layer. (5) The fiber of the present invention not only is compatible with existing OM3/OM4 multimode fibers, but also can support the wavelength-division multiplexing technology in a wavelength range of 850 nm to 950 nm. (6) The MFD of the fundamental mode $LP_{01}$ of the present invention matches the MFD of the single-mode fiber; the fiber is compatible with the single-mode fiber, and supports 1310 nm or 1550 nm single-mode transmission. (7) The reasonable design of the depressed cladding layer parameters improves the bending insensitivity of the fiber. (8) The fiber of the present invention has excellent bending resistance, and is suitable for use in access networks and miniaturized optical devices, and can further improve the transmission capacity, thus adapting to the network demand for high-speed growth of data flow and having important significance in the application of optical communication technology. (9) The present invention is simple to manufacture and is thus suitable for large-scale production.

DETAILED DESCRIPTION OF THE INVENTION

Figure 1:
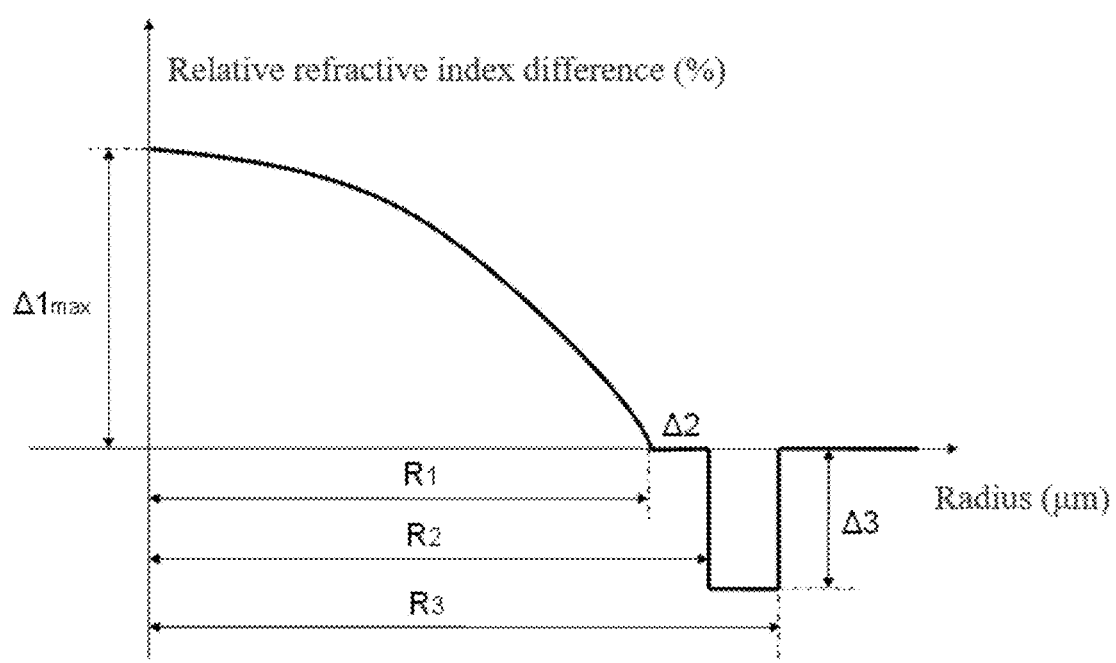
FIG. 1 schematically shows a refractive index profile of one embodiment of the present invention.
Figure 2:
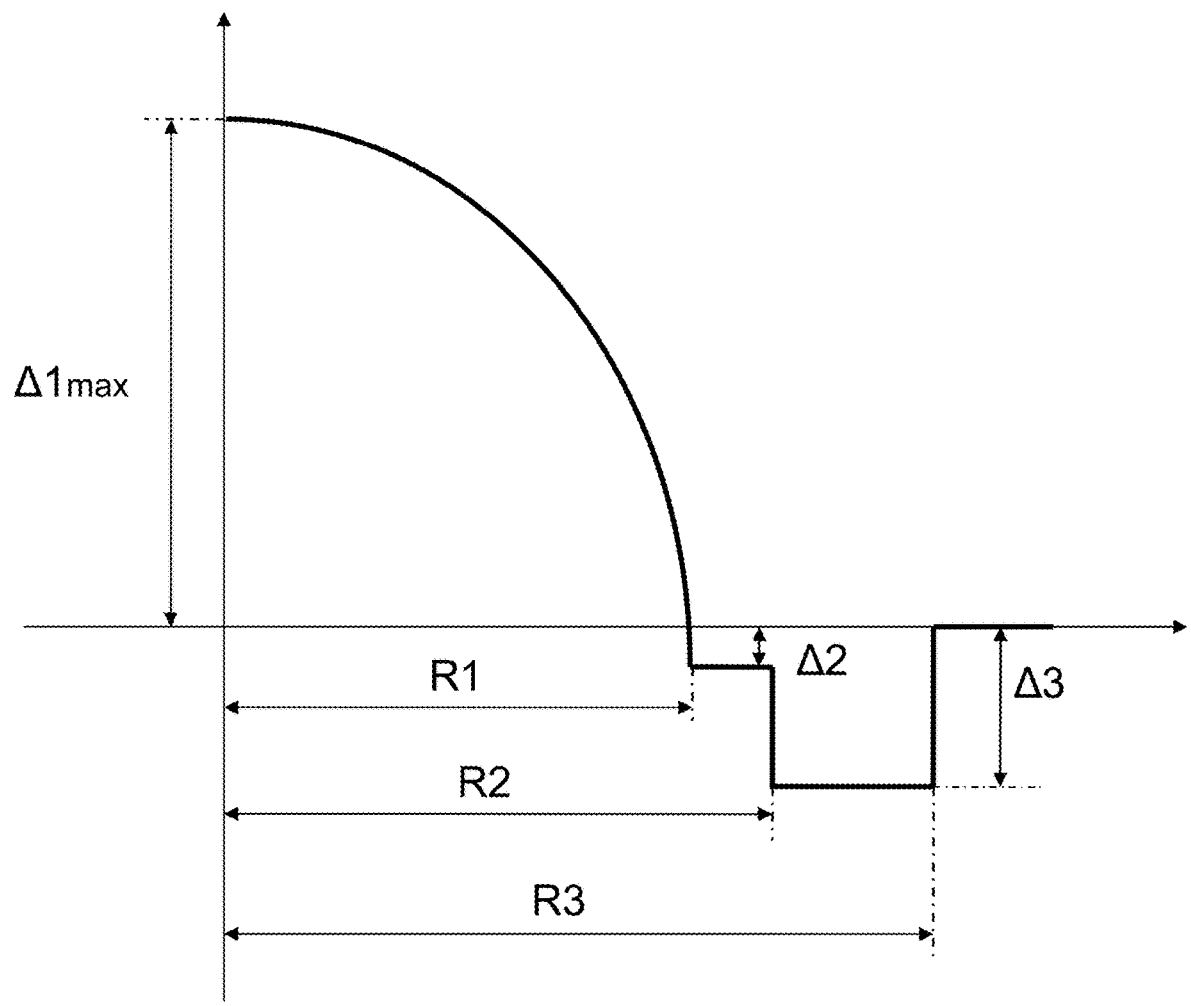
FIG. 2 schematically shows a refractive index profile of another embodiment of the present invention.
Figure 3:
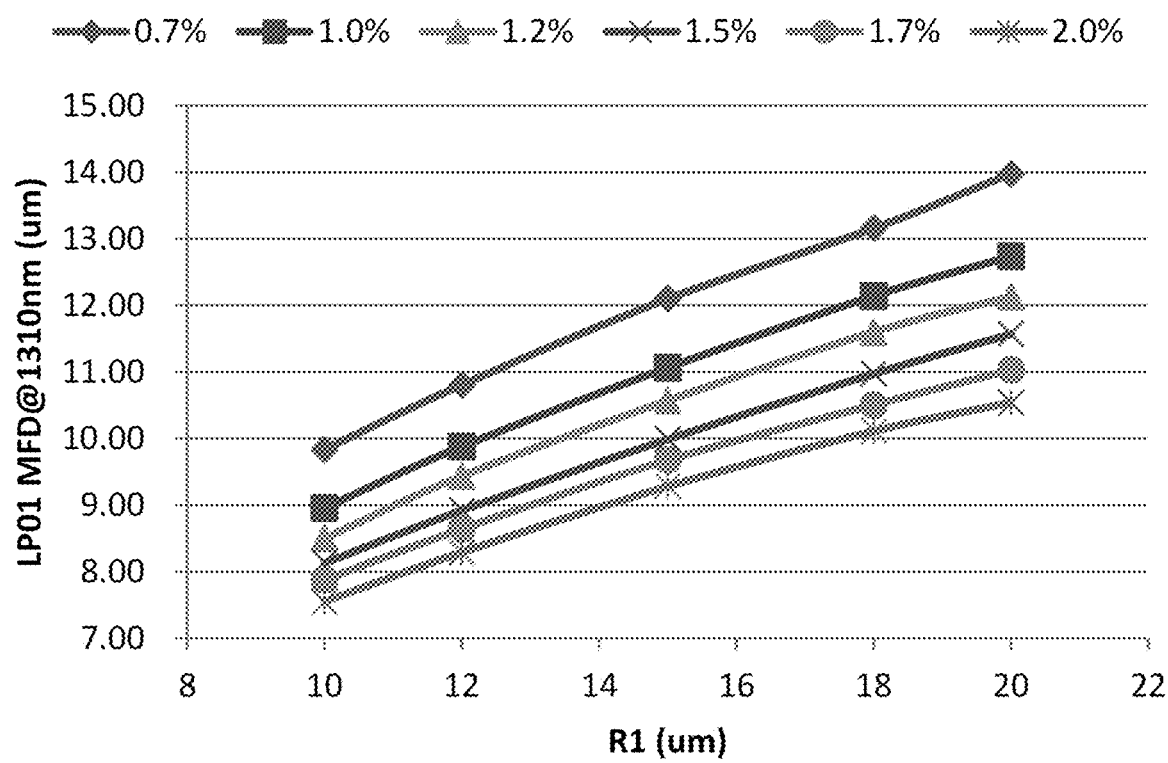
FIG. 3 schematically shows a relationship between a mode field diameter of a fundamental mode $LP_{01}$ at 1310 nm and a core diameter R1 and (Δ1 max−Δ2) of the present invention.
Figure 4:
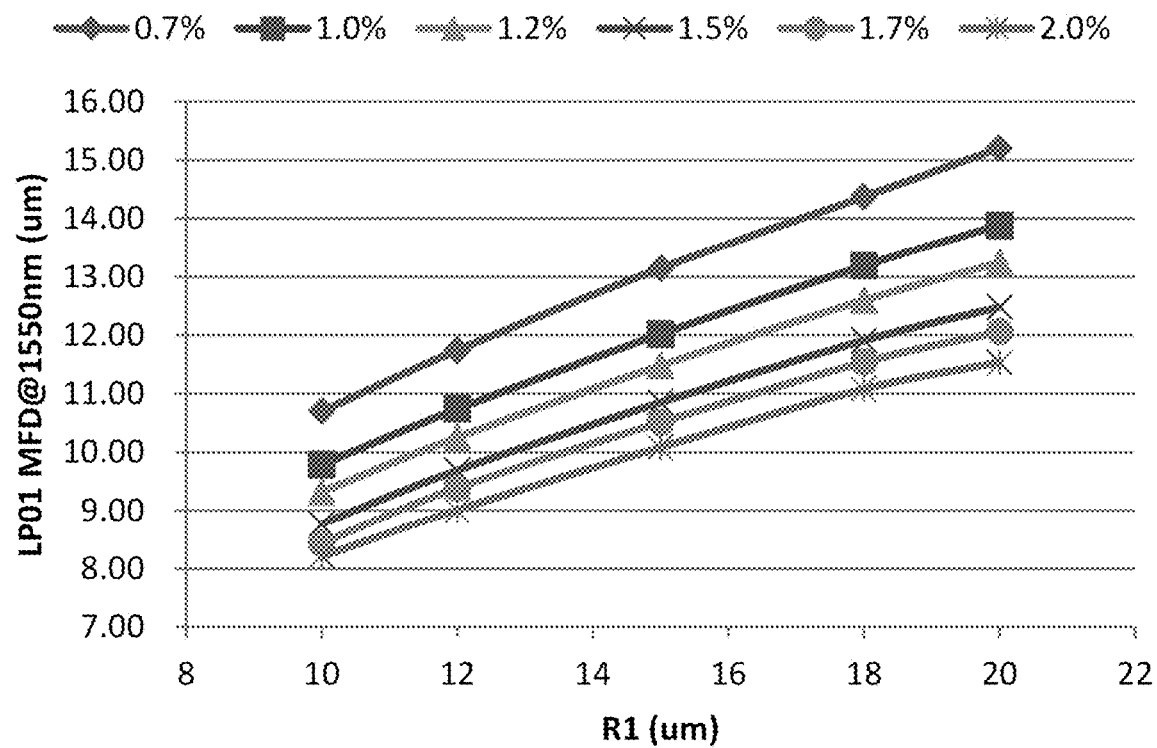
FIG. 4 schematically shows a relationship between a mode field diameter of a fundamental mode $LP_{01}$ at 1550 nm and a core diameter R1 and (Δ1 max−Δ2) of the present invention.
Figure 5:
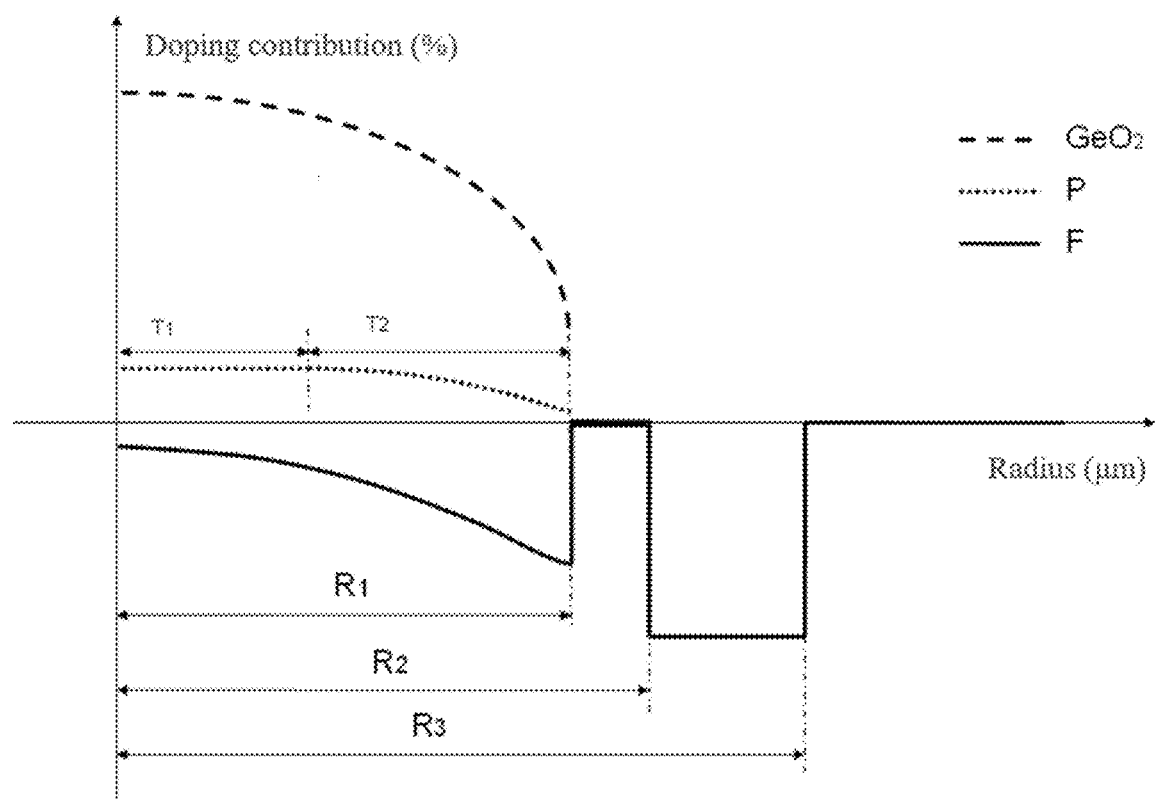
FIG. 5 schematically shows a doping amount profile of one embodiment of the present invention.

Specific embodiments will be given below to further illustrate the present invention.

A fiber comprises a core layer and a cladding. The core layer has a parabolic refractive index profile with α in a range from 1.9 to 2.1, a radius R1, and a maximum relative refractive index difference Δ1 max in a range from 0.7% to 1.7% at a core layer center. The contribution of P at the core layer center is ΔP0; the contribution of P at a boundary between a flat region and a graded region is ΔP1; the contribution fluctuation of P at a boundary of the core layer center and the flat region is $$\Delta P10 = 2\left|\frac{\Delta P1 - \Delta P0}{\Delta P1 + \Delta P0}\right|.$$

The flat region has a width T1, and the graded region has a width T2=R1−T1. The contribution of P at an outer edge of the core layer is ΔP2, and the contribution difference of P between the flat region and an outer edge of the graded region is ΔP21=ΔP2−ΔP1. The contribution of F at the core layer center is ΔF0, and the contribution of F at an edge of the core layer is ΔF1. The cladding has an inner cladding layer, a depressed cladding layer, and an outer cladding layer from inside to outside thereof. The inner cladding layer has a radius R2 and a relative refractive index difference Δ2; the depressed cladding layer has radius R3 and a relative refractive index difference Δ3; and the outer cladding layer is a pure silica glass layer with a radius of 62.5 μm.

According to the present invention, a set of preforms are prepared, drawn, and coated with double layers. The structure and main performance parameters of the fiber are shown in Table 1.

Macrobending loss is tested as follows. The fiber under test is wound one turn to form a circle with a certain diameter (for example, 10 mm, 15 mm, 20 mm, 30 mm, etc.), and the circle is then released. A change in optical power after the winding relative to that before the winding is tested as the macrobending loss of the fiber.

The overfilled bandwidth is measured according to the FOTP-204 method, and the test adopts the overfilled condition.

conventional single-mode fiber by means of an appropriate refractive index profile design. When applied to integrated systems such as narrow cabinets, wiring boxes, etc., the fiber will undergo a very small bending radius. High-order modes transmitted near an edge of the fiber core easily suffer from leakage, thus causing signal loss. The small core-diameter graded-index optical fiber limits leakage of higher-order modes by adding a low refractive index region in the fiber cladding, thus minimizing signal loss.

When used for single-mode transmission, the small core-diameter graded-index optical fiber is in quasi-single-mode transmission, and its coupling with the single-mode fiber is related to the matching degree of the mode field diameters of the fundamental modes LP01 therebetween. The tolerance of the mode field diameters directly influences the splice loss of the fibers. Studies have shown that the splice loss of two single-mode fibers with mode field diameters of $d_1$ and $d_2$ respectively can be expressed as follows:

$$\alpha_s = 20\log\frac{d_1^2 + d_2^2}{2d_1d_2}.$$

ideally, when $d_1=d_2$, i.e., the two fibers have the same the mode field diameter, the splice loss $\alpha_s=0$.

TABLE 1

Main structure parameters and performance parameters of the fiber

| Main parameters of the fiber | Examples | | | |
|---|---|---|---|---|
| | 1 | 2 | 3 | 4 |
| R1 (μm) | 15.2 | 14.3 | 18.5 | 12.4 |
| Δ1max (%) | 1.19 | 1.10 | 1.48 | 0.98 |
| Core layer α | 2.070 | 2.052 | 2.028 | 2.042 |
| ΔF0 (%) | −0.02 | −0.04 | −0.08 | −0.04 |
| ΔF1 (%) | −0.23 | −0.32 | −0.38 | −0.25 |
| T1 (μm) | 2.6 | 11.8 | 6.8 | 7.9 |
| T2 (μm) | 12.6 | 2.5 | 11.7 | 4.5 |
| ΔP0 (%) | 0.08 | 0.17 | 0.13 | 0.18 |
| ΔP10 (%) | 1.7 | 2.8 | 4.3 | 4.4 |
| ΔP21 (%) | −0.07 | −0.11 | −0.08 | −0.15 |
| ΔP2 (%) | 0.01 | 0.06 | 0.05 | 0.03 |
| R2 (μm) | 16.2 | 17.4 | 21.1 | 14.1 |
| Δ2 (%) | −0.05 | −0.18 | −0.01 | −0.29 |
| R3 (μm) | 22.0 | 22.3 | 28.4 | 17.7 |
| Δ3 (%) | −0.35 | −0.48 | −0.56 | −0.60 |
| overfilled bandwidth at 850 nm (MHz-km) | 5181 | 6300 | 3872 | 8394 |
| overfilled bandwidth at 950 nm (MHz-km) | 2740 | 3427 | 2303 | 3377 |
| overfilled bandwidth at 1300 nm (MHz-km) | 799 | 650 | 550 | 792 |
| macrobending loss with a 7.5 mm-bending radius and two turns at 850 nm (dB) | 0.05 | 0.03 | 0.01 | 0.02 |
| macrobending loss with a 7.5 mm-bending radius and two turns at 1300 nm (dB) | 0.10 | 0.08 | 0.02 | 0.05 |
| $LP_{01}$ MFD at 1310 nm (μm) | 10.6 | 10.3 | 11.0 | 9.4 |
| $LP_{01}$ MFD at 1550 nm (μm) | 11.5 | 11.2 | 11.9 | 10.2 |

The small core-diameter graded-index optical fiber has a smaller core diameter, less guided modes, and theoretically a higher bandwidth than a conventional multimode fiber. In order to satisfy the conditions of multimode transmission and reduce inter-mode dispersion in fibers, the core layer refractive index profile of the small core-diameter graded-index optical fiber adopts a design of an "α profile" similar to that of the conventional multimode fiber. In order to perform single-mode transmission, the small core-diameter graded-index optical fiber is enabled to have a mode field diameter (MFD) of a fundamental mode $LP_{01}$ in a single-mode transmission window matched with the MFD of the The center value of the mode field diameter specified under the ITU-T G.652.D standard is in a range from 8.6 μm to 9.5 μm±0.6 μm. Therefore, for G.652 fibers with MFDs of 8.6 μm and 9.5 μm, respectively, at 1310 nm, if the coupling loss is to be controlled within 0.1 dB, the MFDs of fundamental modes LP01 of the small core-diameter graded-index optical fibers at 1310 nm have to be in a range from 7.4 to 10 μm and in a range from 8.2 to 11 μm, respectively. For single-mode fibers with MFDs of 10 μm and 11 μm, respectively, at 1550 nm, if the coupling loss is to be controlled within 0.1 dB, the MFDs of the fundamental modes LP01 of the small core-diameter graded-index optical fibers at 1550 nm have to be in a range from 8.6 to 11.6 µm and in a range from 9.5 to 12.8 µm, respectively.

In sum, the invention relates to a small core-diameter graded-index optical fiber including a core layer and a cladding which includes an inner cladding layer, a depressed cladding layer, and an outer cladding layer from inside to outside thereof. The core layer has a parabolic refractive index profile with a distribution index α in a range from 1.9 to 2.1, a radius R1 in a range from 10 to 21 µm, and a maximum relative refractive index difference Δ1 max in a range from 0.7% to 1.7% at a core layer center, and is a silica glass layer co-doped with germanium Ge, phosphorus P, and fluoride F. The inner cladding layer is a pure silica layer or an F-doped silica glass layer, and has a unilateral width in a range from 0.5 to 5 µm and a Δ2 in a range from −0.4% to 0%. The depressed cladding layer has a unilateral width in a range from 2 to 10 µm and a Δ3 in a range from −0.8% to −0.2%. The outer cladding layer is a pure silica glass layer. The fiber not only is compatible with existing OM3/OM4 multimode fibers, but also can support the wavelength-division multiplexing technology in a wavelength range from 850 nm to 950 nm. The fiber is also compatible with a single-mode fiber, and can support 1310 nm or 1550 nm single-mode transmission. The fiber has excellent bending resistance and is suitable for use in an access network or a miniaturized optical device.

The foregoing description of the exemplary embodiments of the invention has been presented only for the purposes of illustration and description and is not intended to be exhaustive or to limit the invention to the precise forms disclosed. Many modifications and variations are possible in light of the above teaching.

While there has been shown several and alternate embodiments of the present invention, it is to be understood that certain changes can be made as would be known to one skilled in the art without departing from the underlying scope of the invention as is discussed and set forth above and below including claims and drawings. Furthermore, the embodiments described above are only intended to illustrate the principles of the present invention and are not intended to limit the scope of the invention to the disclosed elements.

What is claimed is:

1. A small core-diameter graded-index optical fiber, comprising: a core layer and a cladding which includes an inner cladding layer, a depressed cladding layer, and an outer cladding layer from inside to outside thereof, wherein, the core layer has a parabolic refractive index profile with a distribution index α in a range from 1.9 to 2.1, a radius R1 in a range from 10 to 21 µm, and a maximum relative refractive index difference Δ1max in a range from 0.7% to 1.7% at a core layer center, and is a silica glass layer co-doped with germanium Ge, phosphorus P, and fluoride F; the inner cladding layer is a pure silica layer or an F-doped silica glass layer, and has a unilateral width R2−R1 in a range from 0.5 to 5 µm and a relative refractive index difference Δ2 in a range from −0.4% to 0%; the depressed cladding layer has a unilateral width R3−R2 in a range from 2 to 10 µm and a relative refractive index difference Δ3 in a range from −0.8% to −0.2%; and the outer cladding layer is a pure silica glass layer, wherein P and Ge are used as positive dopants in the core layer, and a concentration of P in the core layer changes to form, from inside to outside, a flat region in which the concentration of P remains substantially unchanged and a graded region in which the concentration of P gradually decreases, and wherein the flat region has a width T1 in a range from 1 to 19.5 µm, and the graded region has a width T2=R1−T1, and T2>1.5 µm.

2. The small core-diameter graded-index optical fiber according to claim 1, wherein the contribution ΔP0 of P at the core layer center is in a range from 0.01% to 0.30%; the contribution of P at a boundary between the flat region and the graded region is ΔP1; a contribution fluctuation ΔP10 of P at a boundary between the core layer center and the flat region is $$\Delta P10 = 2\left|\frac{\Delta P1 - \Delta P0}{\Delta P1 + \Delta P0}\right|,$$

ΔP10 being less than or equal to 5%; the contribution ΔP2 of P at an outer edge of the core layer is in a range from 0% to 0.15%; and a contribution difference ΔP21 of P between the flat region and an outer edge of the graded region is ΔP21=ΔP2−ΔP1, ΔP21 being in a range from −0.3% to −0.01%.

3. The small core-diameter graded-index optical fiber according to claim 1, wherein F is used as a negative dopant in the core layer, and has a doping amount increasing from the core layer center to an edge of the core layer, a contribution ΔF0 of F at the core layer center being in a range from 0.0% to −0.1%, and a contribution ΔF1 of F at the edge of the core layer being in a range from −0.45% to −0.1%.

4. The small core-diameter graded-index optical fiber according to claim 1, wherein the inner cladding layer has a relative refractive index difference Δ2 less than or equal to a relative refractive index difference Δ1 min at the edge of the core layer, i.e., Δ2≤Δ1 min.

5. The small core-diameter graded-index optical fiber according to claim 1, wherein the fiber has a bandwidth of 3500 MHz-km or more than 3500 MHz-km at a wavelength of 850 nm, a bandwidth of 2000 MHz-km or more than 2000 MHz-km at a wavelength of 950 nm, and a bandwidth of 500 MHz-km or more than 500 MHz-km at a wavelength of 1300 nm.

6. The small core-diameter graded-index optical fiber according to claim 1, wherein the fiber has a bandwidth of 5000 MHz-km or more than 5000 MHz-km at a wavelength of 850 nm, a bandwidth of 3300 MHz-km or more than 3300 MHz-km at a wavelength of 950 nm, and a bandwidth of 600 MHz-km or more than 600 MHz-km at a wavelength of 1300 nm.

7. The small core-diameter graded-index optical fiber according to claim 1, wherein a fundamental mode LP01 of the fiber at 1310 nm or 1550 nm has a mode field diameter in a range from 8 to 12 µm.

8. The small core-diameter graded-index optical fiber according to claim 1, wherein the fiber has a macrobending loss of less than 0.2 dB with a 7.5 mm-bending radius and two turns at a wavelength of 850 nm, and a macrobending loss of less than 0.5 dB with a 7.5 mm-bending radius and two turns at a wavelength of 1300 nm.

9. The small core-diameter graded-index optical fiber according to claim 1, wherein the core layer has a radius R1 in a range from 12 to 20 µm.

* * * * *